Jan. 15, 1963 E. SCHUMM 3,073,063
HOLDER FOR A FLOWER
Filed Aug. 3, 1959
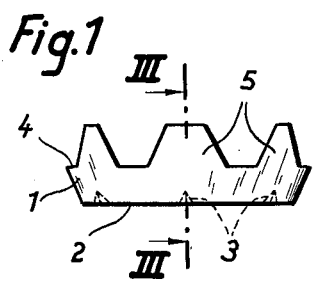
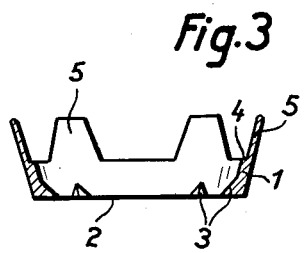
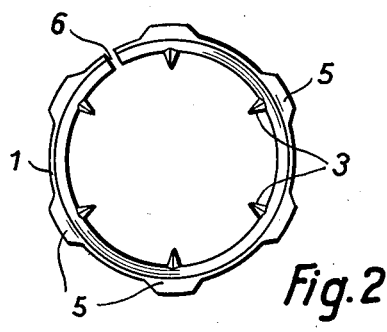
INVENTOR.
Erich Schumm
BY Michael S. Striker
Attorney

United States Patent Office 3,073,063
Patented Jan. 15, 1963

3,073,063
HOLDER FOR A FLOWER
Erich Schumm, Siegelsbergerstrasse 17, Murrhardt, Wurttemberg, Germany
Filed Aug. 3, 1959, Ser. No. 831,253
Claims priority, application Germany Feb. 14, 1959
1 Claim. (Cl. 47—55)

This invention relates to a holder for a flower.

It is an object of this invention to provide a holder for a flower which will prevent the flower from spreading laterally too far and thus spoiling its appearance.

It is a further object of this invention to hold the flower by a band resiliently surrounding the lower part of the flower.

It is another object of this invention to provide a ring-shaped band in the form of a frusto-cone for holding the lower part of a flower to prevent it from spreading too far laterally.

It is still another object of this invention to provide a band made out of synthetic material which is easy to produce in great numbers at a very low cost.

It is a still further object of this invention to provide a ring-shaped band provided with prongs to hold the band on a flower.

With these objects in view the present invention provides a holder for a flower comprising a ring-shaped band for surrounding the lower part of a flower and prong means on the inside of the band for holding the band on the flower.

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which:

FIG. 1 is a front elevational view of a holder according to the present invention;

FIG. 2 is a plan view of the device according to the present invention; and

FIG. 3 is a sectional view of FIG. 1 along lines III—III.

Referring to the drawing a ring-shaped band, preferably of frusto-conical configuration, is provided with prong means 3 on the inside thereof. Prong means 3 are preferably located at the annular edge 2 of smaller diameter end of the frusto-conical band.

In the preferred construction, cutouts 4 are formed on the other annular edge of the band, that is its wider portion, so that this portion has the shape of a number of spaced teeth 5. The ring-shaped band is not closed but has ends which are preferably spaced from each other so as to form a gap 6 shown in FIG. 2. The band is preferably made of resilient material such as polystyrene and in the preferred construction is made with integral prongs 3 by which the band is held on the flower.

A ring-shaped band provided with the gap 6 can be resiliently spread so that the band can be placed directly onto the lower part of a flower without threading its stem through the band since the leaves would interfere with the threading of the band or be torn by the prongs.

Once the ring-shaped band 1 is placed onto the lower part of a flower, the prongs 3 will securely hold the band on the lower part of the flower so that the flower itself is resiliently confined within the ring-shaped band. The frusto-conical configuration of band 1 will assist in holding the ring-shaped band on the flower.

Some flowers such as carnations or chrysanthemums have the tendency to produce pronounced lateral growth, under certain temperature and weather conditions. The result of excessive lateral growth and a possible accompanying fissure along the lower parts of the outer petals, distracts from the pleasing appearance of a flower and also reduces its commercial value.

A ring-shaped band surrounding the lower part of a flower and confining the lower part of the outer petal from unduly spreading and retained on the flower by the prongs will produce a pleasing appearance and increase the commercial value of certain flowers. The axial length of the ring-shaped band 1 can of course, be adapted to the particular flowers for which they are intended. Production of the band of synthetic material, such as the one mentioned, namely polystyrene, will result in a very cheap and easily manufactured holder for a flower.

It will be understood that each of the elements described above, or a combination thereof, may also find a useful application in other types of flower holders different from the type described above.

While the invention has been illustrated and described as embodied in a frusto-conical holder for flowers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

A device for holding the petals of a flower against spreading, said device comprising a slightly frusto-conical resilient band of a synthetic plastic material formed with a gap permitting the passage of a flower stem, said band having a smaller-diameter end, a toothed larger-diameter end, and comprising a plurality of substantially radial inwardly extending flower engaging prongs adjacent to said smaller-diameter end thereof, said band connectable to a flower in such manner that the outer parts of flower petals extend through the toothed larger-diameter end thereof and that the band surrounds and resiliently confines the inner parts of the flower petals.

References Cited in the file of this patent

UNITED STATES PATENTS

| 391,050 | Hiller | Oct. 16, 1888 |
| 831,086 | Maxfield | Sept. 18, 1906 |
| 910,300 | Magruder | Jan. 19, 1909 |
| 1,064,301 | Donegan | June 10, 1913 |
| 1,072,903 | Bippart | Sept. 9, 1913 |
| 1,114,791 | Miller | Oct. 27, 1914 |
| 1,762,908 | Bennett | June 10, 1930 |
| 2,043,297 | Luft | June 9, 1936 |
| 2,486,109 | Brutocao | Oct. 25, 1949 |
| 2,641,086 | Shinoda | June 9, 1953 |
| 2,861,318 | Fernberg | Nov. 25, 1958 |
| 2,868,214 | Levy | Jan. 13, 1959 |